United States Patent [19]

Goscenski, Jr.

[11] Patent Number: 4,513,633
[45] Date of Patent: Apr. 30, 1985

[54] POSITIVE DRIVE AND GENERATED CAM SURFACES THEREFOR

[75] Inventor: Edward J. Goscenski, Jr., Battle Creek, Mich.

[73] Assignee: Eaton Corporation, Cleveland, Ohio

[21] Appl. No.: 366,611

[22] Filed: Apr. 8, 1982

[51] Int. Cl.³ .................. F16H 35/04; F16H 1/44; F16B 13/42
[52] U.S. Cl. .................. 74/650; 74/710.5; 192/70.23
[58] Field of Search .......... 74/650, 710.5, 711, 74/710; 192/49, 54, 70.23, 93 A

[56] References Cited

U.S. PATENT DOCUMENTS

| | | | |
|---|---|---|---|
| 1,111,728 | 9/1914 | Besserdich et al. | 74/710.5 |
| 1,477,311 | 12/1923 | Cartwright | 74/650 |
| 2,060,558 | 11/1936 | De Lavaud | 74/650 |
| 2,179,923 | 11/1939 | De Lavaud | 74/650 |
| 2,397,673 | 4/1946 | Lewis | 74/650 X |
| 2,509,560 | 5/1950 | Craft | 74/650 |
| 2,555,044 | 4/1951 | Lewis | 74/650 |
| 2,790,334 | 4/1957 | Wildhaber | 74/650 |
| 2,918,831 | 12/1959 | Wildhaber | 74/710.5 |
| 2,978,929 | 4/1961 | Roberts | 74/711 |
| 3,611,833 | 10/1971 | Baremor | 74/711 |
| 3,624,717 | 11/1971 | Brubaker | 74/711 |
| 3,837,236 | 9/1974 | Kagata | 74/711 |
| 3,906,812 | 9/1975 | Kagata | 74/711 |
| 4,136,582 | 1/1979 | Boor | 74/710 |
| 4,159,656 | 7/1979 | Tomich | 74/650 |
| 4,290,321 | 9/1981 | Wilson | 192/93 A X |

Primary Examiner—Lawrence J. Staab
Assistant Examiner—Arthur T. Quiray
Attorney, Agent, or Firm—C. H. Grace; L. J. Kasper

[57] ABSTRACT

A positive drive and an improved clutch actuating mechanism for use therein is disclosed. The positive drive has a housing (10) retaining a pair of spaced drive clutches (54 and 56) which lock a pair of axles (18 and 20), respectively, to housing (10) for one-to-one rotation. The clutches are moved from the disengaged to the engaged mode by axial movement of drive couplings (30 and 32) which include cam members (38 and 40) respectively. Input torque is transmitted from the housing to the cam members by means of a shaft (48) and the axial forces required to engage the clutches are transmitted from the shaft to the cam members through engagement of a shaft cam surface (49) and a ramp cam surface (51). In accordance with the invention, the engaging cam surfaces are defined by a common locus of generating lines (101–106) such that the cam surfaces are in surface-to-surface contact, rather than line contact or point contact, over the entire range of pivotal movement of the shaft, relative to the cam member.

21 Claims, 13 Drawing Figures

POSITIVE DRIVE AND GENERATED CAM SURFACES THEREFOR

BACKGROUND OF THE DISCLOSURE

The present invention relates to positive drives, and more particularly, to an improved clutch actuating mechanism for use in positive drives.

Although the improved clutch actuating mechanism of the present invention may be utilized advantageously in many different devices, it is especially advantageous when used in a traction modifying device, and more specifically, in a positive drive, and will be described in connection therewith.

Traction modifying devices have become popular for use in vehicles, in the drive train between the vehicle engine and the driven wheels. The primary function of a traction modifying device is to facilitate driving on slippery surfaces and in off-road conditions. These devices are especially useful where one of the driven wheels is momentarily subjected to worse traction conditions than the other driven wheel.

Traction modifying devices are generally categorized in three classes:
1. Limited slip differentials such as illustrated in U.S. Pat. Nos. 3,611,833 (nonbiased), and 3,624,717 (spring biased);
2. Locking differentials such as illustrated in U.S. Pat. Nos. 1,111,728 (manually actuated), 2,978,929 (hydraulically operated), and 3,831,462 (speed responsive); and
3. Positive drives such as illustrated in U.S. Pat. Nos. 1,477,311; 2,060,558; and 2,179,923.

During straight movement of a vehicle employing a positive drive, the engine power is transmitted approximately equally to the driven wheels, which rotate at the same speed. During a potential spin-out condition (e.g., one wheel on ice and the other on pavement), the engine power is transmitted to the driven wheels in proportion to their instantaneous traction limitations, whereby the wheels are still driven at the same speed.

When the vehicle turns a tight corner, power is transmitted only to the slower moving wheel, while the faster moving wheel is permitted to free wheel, relative to the input. When the vehicle is making a gradual turn, and the wheels are driven at slightly different speeds, the positive drive transmits slightly more torque to the slower turning wheel than to the faster turning wheel. Thus, a positive drive performs in a manner similar to an open differential during operating conditions which would make an open differential desirable, and performs in a manner similar to a rigid axle when operating conditions would make a rigid axle desirable.

The general construction and operation of positive drives has been known for over 40 years, as evidenced by the previously cited positive drive patents. A major disadvantage of prior art positive drives has been the use of large, complicated cam members, typically disposed between the opposed axles. As vehicles are continually downsized, it becomes more desirable to produce traction modifiers which are smaller and lighter. One way of accomplishing this objective is to eliminate the large central cam members and use a one piece housing and a single shaft member which comprises one of the cam members. Also, it is desirable to have inboard axle retention, such as "C" clips as used on most vehicle differentials, and this requires that the single shaft be removable. Such a design is illustrated and described briefly hereinafter, and is described in greater detail in copending application U.S. Ser. No. 355,971, filed Mar. 2, 1982, in the name of Edward J. Goscenski, Jr., and assiged to the assignee of the present invention.

One characteristic of a positive drive which distinguishes it from limited slip and locking differentials is that, in a positive drive, all of the axial force required to engage the clutch (locking the output to the input) is transmitted through the cam arrangement, whereas in limited slip and locking differentials, a substantial portion of the axial force is transmitted through the pinion gears and side gears. Thus, the engaging cam surfaces of a positive drive are subjected to greater loads and surface stresses, substantially increasing the potential for stress failure.

The problems associated with the greater axial forces in positive drives are magnified in the design of the type to which the present invention relates, in which the shaft is part of the cam arrangement. In such a design, it has seemed inevitable, prior to the present invention, that the engagement of the surfaces on the cam member and shaft would result in line contact, rather than surface contact during the active range of relative movement between the cam and shaft. If only line contact occurs, which under some conditions becomes only point contact, the large axial forces referred to previously will result in huge surface stresses over the very small amount of actual contact area and result in premature failure of the device.

SUMMARY OF THE INVENTION

Accordingly, it is an object of the present invention to provide a clutch actuating mechanism, which may be used in a positive drive, in which there is a substantial amount of surface-to-surface contact between the shaft and the mating cam.

It is a more specific object of the present invention to provide such a mechanism in which the surface-to-surface contact is maintained during the entire range of movement of the shaft, relative to the cam.

It is another object of the present invention to provide a simple, practical method for generating the engaging surfaces on the cam and shaft whereby the desired surface-to-surface contact occurs.

The above and other objects of the present invention are accomplished by the provision of a clutch actuating mechanism of the type including an input member adapted to be rotated by input driving torque, and an output member defining an axis of rotation of the mechanism. A clutch means is operably associated with the output member and has a disengaged mode and an engaged mode. In the disengaged mode, the clutch means allows the output member to rotate relative to the input member, and in the engaged mode, the clutch means maintains a predetermined rotational relationship between the output member and the input member. A cam means is operably associated with the clutch means to move the clutch means from the disengaged mode to the engaged mode. A shaft means is disposed adjacent the cam means and is mounted for rotation with the input means. Operative movement of the cam means to move the clutch means occurs in response to pivotal movement of the shaft means, about the axis of the mechanism, relative to the cam means. The cam means includes a circumferentially-extending ramp cam surface, and the shaft means includes a shaft cam surface disposed to engage the ramp cam surface during the pivotal movement of the shaft means. The improvement in the clutch actuating mechanism comprises the ramp cam surface and the shaft cam surface both being defined by a common locus of generating lines, whereby the cam surfaces maintain substantially surface-to-surface contact over the full range of the pivotal movement of the shaft means.

In accordance with one aspect of the present invention, each of the generating lines is tangential to an imaginary construction cylinder, the axis of which coincides with the axis of rotation of the mechanism. Each of the generating lines is disposed at an oblique angle B relative to a first construction plane containing the axis of the shaft means and being perpendicular to the axis of the mechanism.

DESCRIPTION OF THE PREFERRED EMBODIMENT

Figure 1:
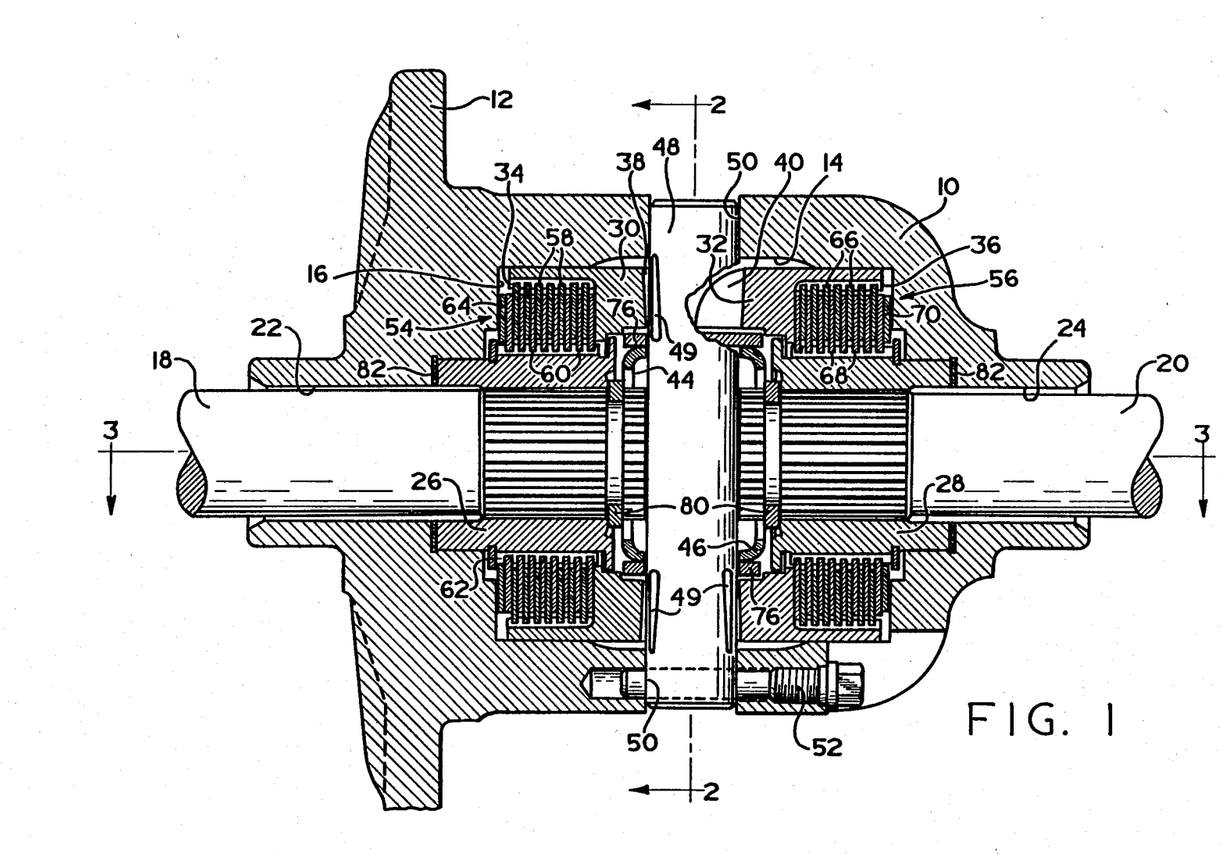
FIG. 1 is an axial cross section of a positive drive taken along line 1—1 of FIG. 2.
Figure 2:
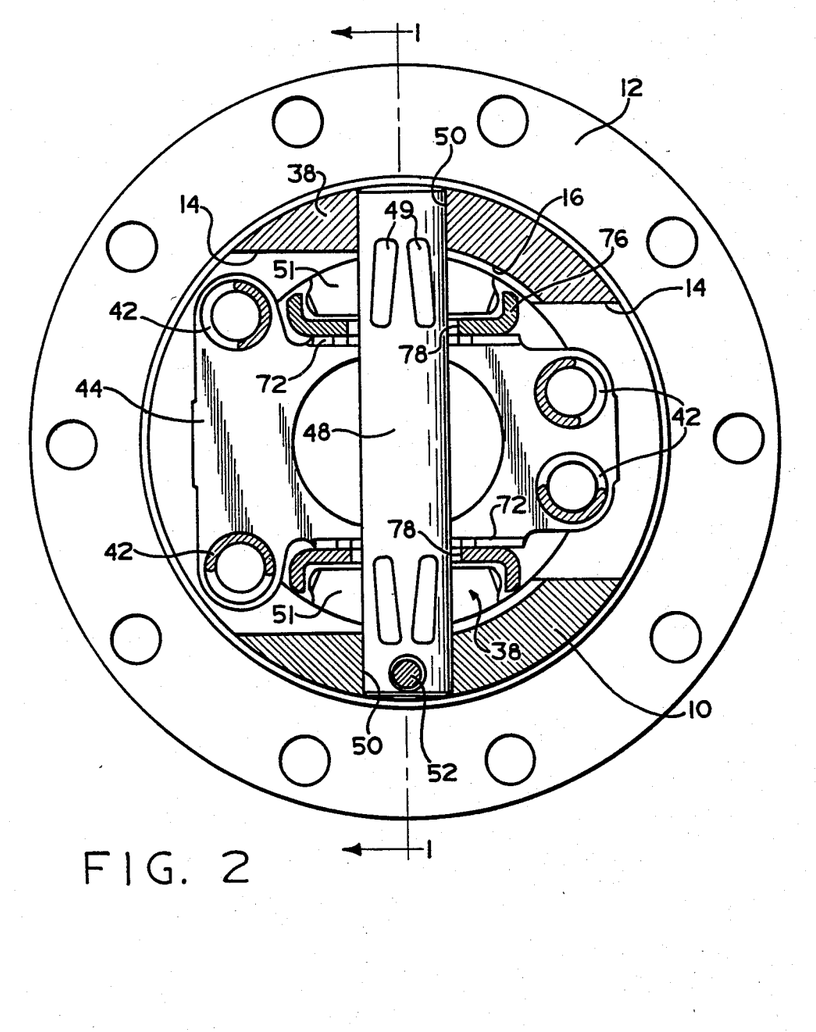
FIG. 2 is a transverse section taken along line 2—2 of FIG. 1.
Figure 3:
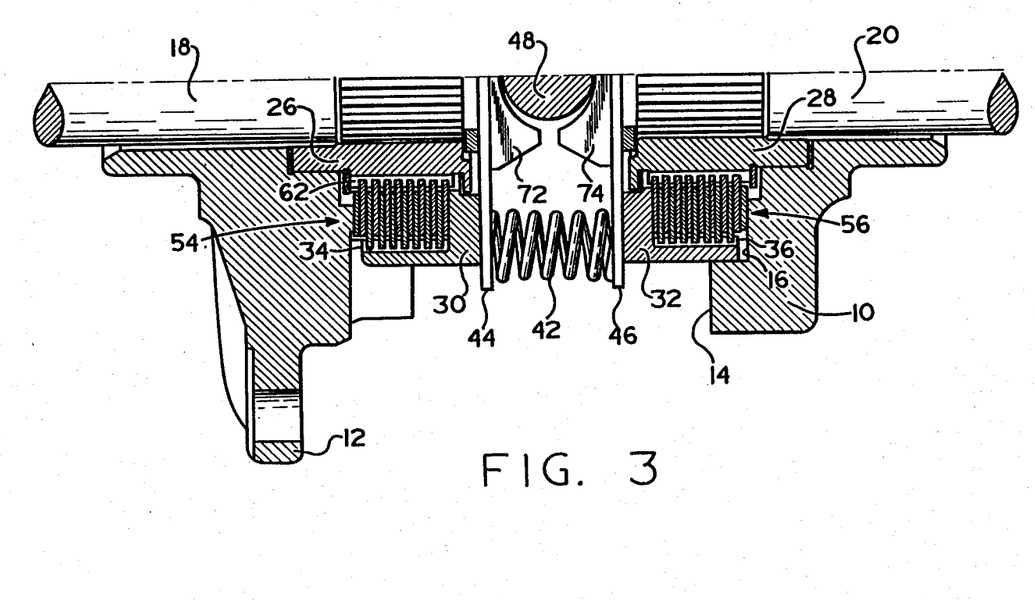
FIG. 3 is a sectional view of one-half of a positive drive taken along line 3—3 of FIG. 1.

Referring now to the drawings which are not intended to limit the present invention, FIGS. 1—3 show a one piece housing 10 which has a flange 12 that is designed for securement to an input gear. A pair of windows 14 (FIG. 2) are located in housing 10 and are sized for insertion of the components of the positive drive within a cavity 16 of housing 10. A pair of axles 18 and 20 are rotatable within axially aligned openings 22 and 24 in the housing.

Components of the drive include a pair of identical rotatable splined couplings 26 and 28 having internal teeth engaged with teeth on inner ends of axles 18 and 20. A pair of identical drive couplings 30 and 32 are journalled in cavity 16 for rotation relative to housing 10. Couplings 30 and 32 each include an internal array of teeth 34 and 36, respectively, and spaced, radially disposed cams 38 and 40, best illustrated in FIGS. 4-6. Preloaded springs 42 contact at each end a pair of identical spring plates 44 and 46 in contact with couplings 30 and 32 to bias the drive couplings axially outwardly toward axles 18 and 20.

Figure 4:
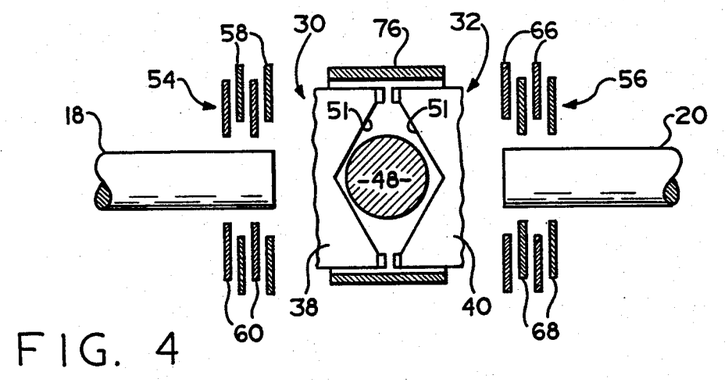
FIG. 4 is a schematic view of components of the positive drive, illustrating a positive drive in a nondriving condition.
Figure 5:
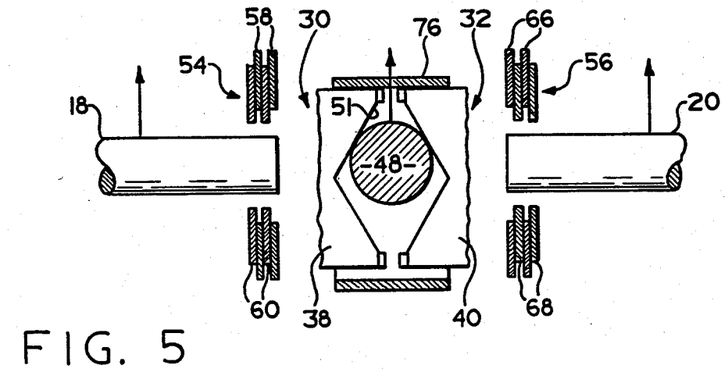
FIG. 5 is a view similar to FIG. 4 illustrating the device driving both axles of a vehicle.
Figure 6:
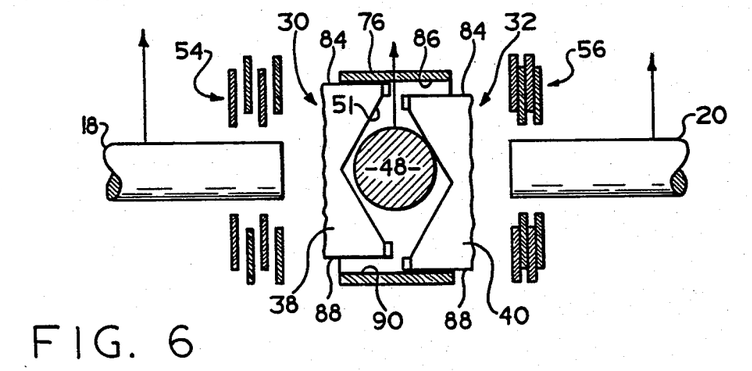
FIG. 6 is a view similar to FIG. 4 illustrating the device driving one axle of a vehicle while permitting the other axle to free-wheel.

Interposed between cams 38 and 40 is a shaft 48 having eight cam surfaces 49, four on each end, for engagement with cam surfaces 51 of cams 38 and 40 (see FIGS. 4-6). The shaft projects through a pair of aligned openings 50 in housing 10 and is secured to the housing by a fastener 52. Although shown as generally cylindrical, shaft 48 may have a cross section that is not circular, e.g., the cross section may be a square, a hexagon, or of variable cross section as long as it may be placed within its given location.

Drive clutches 54 and 56 each include annular discs, a drive coupling, and a spline coupling. Discs 58 of clutch 54 have teeth engaged with teeth 34 of drive coupling 30 and discs 60 of clutch 54 are interposed between each of the discs 58 and have teeth engaged with an external array of teeth 62 on spline coupling 26. The toothed engagement of the discs ensure one-to-one rotation of each of the discs with the respective coupling. An annular thrust washer 64 is interposed between the disc 60 farthest to the left in FIG. 1 and housing 10. The disc 60 farthest to the right in FIG. 1 contacts a radially extending annular surface of drive coupling 30. Clutch 56 is configured similar to clutch 54 with discs 66 and 68 and thrust washer 70. The annular discs 58, 60, 66, and 68 are well known in the traction modifying differential art as illustrated by U.S. Pat. No. 3,313,180 and may be secured to the respective coupling by means other than teeth to accomplish the one-to-one rotation.

Spring plates 44 and 46 include a pair of spaced wings 72 and 74 which encircle shaft 48 and form a support for balking clamps 76. The balking clamps each include an opening 78 to loosely receive shaft 48. Axles 18 and 20 are secured to the drive by means of a pair of "C" clips 80 in a well known manner. A thrust washer 82 is seated between the end of each of the couplings 26 and 28 and the housing 10. For a detailed description of the balking clamps 76 and of the method of assembling the positive drive described herein, reference should be made to copending application U.S. Ser. No. 355,971, incorporated previously.

The operation of the positive drive is best described with reference to FIGS. 4-6. The positive drive may be used in either front wheel or rear wheel drive vehicles or between two drive axles. It will be described with reference to a rear drive automotive application. FIG. 4 shows the vehicle in a stationary position with axles 18 and 20 adapted to be connected to ground engaging wheels. Shaft 48 is secured to housing 10 which is rotated by an input gear supplied with power from the engine of the automobile. Rotation of couplings 30 and 32 without springs 42 will be resisted to some degree by the friction between the discs. The degree of resistance is increased by the preloaded force exerted by springs 42. Upon rotation of housing 10 and, accordingly, pivotal movement of shaft 48 during straight movement of the automobile, the cam surfaces 49 on shaft 48 contact surfaces 51 on cams 38 and 40 forcing couplings 30 and 32 axially outwardly. This axial movement results in contact between the discs and their engagement with the thrust washer and the housing. This results in a condition illustrated in FIG. 5 and the subsequent rotation of axles 18 and 20 in a one-to-one relationship. The clutches are designed as fully locking self-energizing clutches to ensure complete lock-up once engagement is initiated.

When the resistance to rotation on one axle is relatively low compared to the resistance to rotation of the other axle, such as when one wheel of the automobile is located on ice and the other wheel is located on dry pavement, movement of shaft 48 can only result in driving the two axles at the same angular velocity. It is impossible for shaft 48 to drive one coupling 30 or 32 and, accordingly, one axle 18 or 20 faster than the other coupling or axle.

When the automobile is turning a corner, one axle will want to rotate faster than the other axle. Cornering initially causes a condition to exist similar to that illustrated in FIG. 5. However, as one axle, e.g., 18, begins to rotate faster than the other axle 20 as shown by the magnitude of the arrows in FIG. 6, drive coupling 30 is rotated by axle 18 via clutch 54 in the direction of axle 18 causing cam 38 to move out of drive engagement with surfaces on shaft 48. This results in disconnecting axle 18 from coupling 30 (except for a small amount of preload torque transmitted through the disc due to spring 42) and allowing axle 18 to rotate at any desired angular velocity faster than the angular velocity of axle 20. Axle 20, the slower rotating axle, will continue to be driven by shaft 48 through cam 40 and clutch 56.

Without balking clamps 76, continued rotation of coupling 30 in the direction of rotation of axle 18 would again result in contact between cam 38 and surfaces on shaft 48 on the opposite drive cam and hence axial movement of coupling 30 and the driving of axle 18 at the angular velocity of axle 20. Such continued rotation in a positive drive is prevented by limiting the rotational movement between couplings 30 and 32 relative to one another. As illustrated in FIG. 6, if coupling 30 continues to rotate in the same direction as axle 18 at an angular velocity exceeding that of coupling 32, contact is made between surface 84 of cam 38 and surface 86 of balking clamp 76. Balking clamp 76 is so configured to also ensure contact between surface 88 of cam 40 and surface 90 of balking clamp 76. This dual contact prevents the continued movement of cam 38 relative to cam 40 which is in contact with shaft 48, thus preventing the cam 38 from again making contact with shaft 48 on the opposite side. This ensures that coupling 30 will not be driven in an opposed direction by shaft 48 when the angular velocity of axle 18 exceeds axle 20.

Due to the limited amount of axial movement that exists between couplings 30 and 32, and the relative rotation between couplings 30 and 32, and the tolerances within the clutches, the distances between surfaces 84 and 88 on cams 38 and 40, and the distance between surfaces 86 and 90 on balking clamps 76 must be carefully controlled. Due to the simplicity of design of the balking clamp 76 and the cams 38 and 40, this may be readily and inexpensively accomplished. The unit will also operate in a similar manner in left turns and when driven in reverse, and such operation will not be described in detail herein.

Cam surfaces 49 and 51

As was mentioned in the background of the specification, one characteristic of positive drives is the large amount of axial force transmitted by the shaft 48, through the cams 38 and 40, to engage the clutches 54 and 56. In the subject embodiment of the invention, it is known that the total axial forces transmitted in the manner described have exceeded 50,000 lbs. Such large axial forces clearly indicate the critical need for maintaining surface-to-surface contact as the shaft 48 engages one or both of the cams 38 and 40, as shown and described in connection with FIGS. 4-6.

Figure 7A:
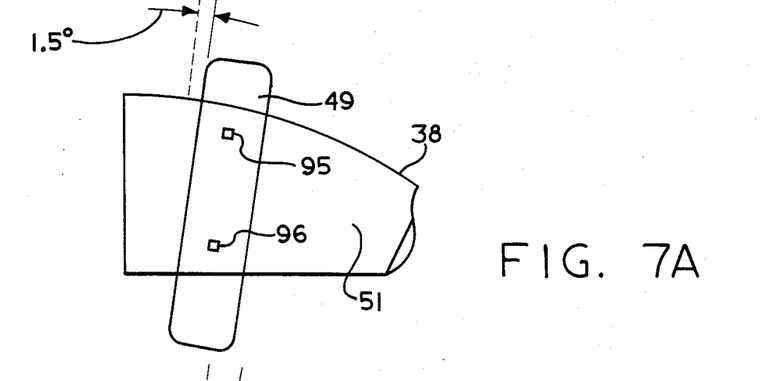
FIGS. 7A, 7B, and 7C are somewhat schematic views illustrating the engagement of the cam surfaces, in a direction normal to the cam surfaces, in different pivotal positions of the shaft, on a scale approximately three times that of FIGS. 1-3.
Figure 7B:
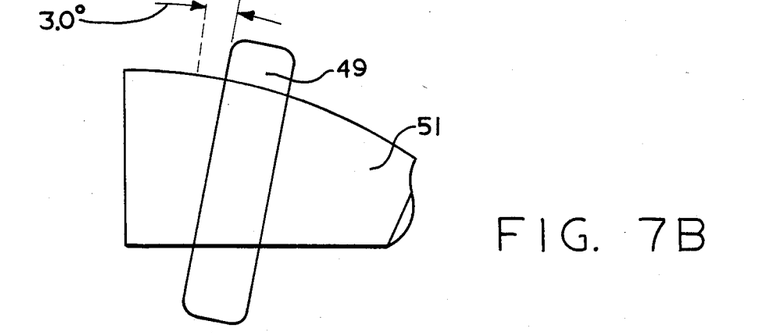
Figure 7C:
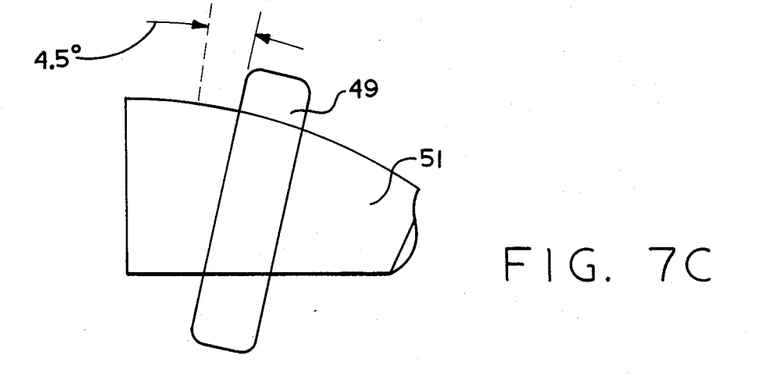

Referring now to FIGS. 7A, 7B, and 7C, the object of maintaining surface-to-surface contact will be described further. FIGS. 7A, 7B, and 7C are views taken in a direction approximately normal to one of the ramp cam surfaces 51, illustrating the positional relationship of the shaft cam surface 49 to the ramp cam surface 51. Each of FIGS. 7A, 7B, and 7C include an indication of the pivotal movement of the shaft 48 and illustrates various operating positions.

FIG. 7A illustrates the condition as the shaft 48 approaches the position shown in FIG. 5, and cam surface 49 begins engagement with cam surface 51. Typically, the shaft 48 would be pivoted about 1.5 degrees about the axis defined by the axles 18 and 20.

In FIG. 7B, it may be seen that shaft 48 is pivoted about 3.0 degrees, thus moving shaft cam surface 49 into engagement with a different portion of the ramp cam surface 51. FIG. 7B represents a condition which would occur in the event of loose tolerances, thin clutch discs, or as a result of a period of wear during operation.

In FIG. 7C, the shaft 48 is pivoted to a position 4.5 degrees from its original, centered position shown in FIG. 4. FIG. 7C represents a condition in which factors such as relatively looser tolerances have been followed by wear of components such as clutch discs, thus permitting a greater range of pivotal movement of the shaft 48, in order to fully engage the respective clutch 54. It should be appreciated that the range of pivotal movement of shaft 48, as represented in FIGS. 7A, 7B, and 7C is by way of example only, and in various designs, and under various operating conditions, the range of movement of surface 49, relative to surface 51, may differ.

It should be understood by those skilled in the art that it is not possible for either the shaft cam surface 49 or the ramp cam surface 51 to comprise a flat, planar surface, and have full surface-to-surface contact over the full area of overlap of surfaces 49 and 51, especially taking into account the possible range of pivotal movement of the shaft 48. Instead, both of the surfaces 49 and 51 are somewhat "warped", i.e., if the portion of the cam surface 51 near the axis 92 were considered generally parallel to the plane of the drawing, then at the right-hand end of the surface 51, the radially outermost portion of surface 51 would be below the plane of the drawing, while the radially innermost portion of the surface 51 would be above the plane of the drawing. This explanation is not intended as an accurate description of the surface, and is not intended to limit the invention, but is intended merely as an aid in understanding the subsequent explanation.

As is well known to those skilled in the art, a critical feature of a device of the type to which the invention relates is the accuracy of the "cam rise", i.e., the axial movement of the cam per degree of relative rotation of the cam members, or in this case, per degree of pivotal movement of the shaft 48 relative to cam member 38. With this requirement in mind, explanation will now be given of the reason why the cam surfaces 49 and 51 cannot be flat, planar surfaces. Referring again to FIG. 7A, a pair of finite surface areas 95 and 96 are illustrated, area 95 being disposed further outward radially than area 96. As the shaft 48 pivots, relative to the cam member 38, the distance of movement in the circumferential direction of area 95 will be greater than the distance of movement in the circumferential direction of area 96, because of the different radial locations. Therefore, in order for both of the areas 95 and 96 to see the same amount of cam rise, and maintain surface contact, it is necessary for the angle of the cam surface 51 to be shallower further outward radially (or to be steeper toward the radially innermost part of surface 51). As a result of this decrease in the cam angle toward the radially outermost part of the cam surface 51, the cam surface 51 has the warped configuration generally described previously.

In accordance with one object of the present invention, the invention provides a shaft cam surface 49 and a ramp cam surface 51 which are in engagement, or surface-to-surface contact, throughout the range of pivotal movement of the shaft 48. Because of this particular objective, it is one feature of the present invention that the surfaces 49 and 51 are both defined by the same locus of generating lines, from which it follows that full surface-to-surface contact will occur throughout the operating range. It is another feature of the present invention to provide a simple, practical method for generating the engaging surfaces 49 and 51, whereby the desired surface-to-surface contact occurs. Applicant believes that it would be possible, by the use of integral equations, to calculate the theoretical configuration of surfaces 49 and 51 which would mathematically result in perfect surface contact throughout the operating range which would be a long and somewhat complex equation, not compatible to known fabrication methods. An important aspect of the present invention is to provide a practical method of generating the surfaces such that the generated surface will, over its entire extent, be within about 0.0001 inches of the theoretical surface. It should also be noted that the method of generation to be described and illustrated hereinafter is the same for all eight of the shaft cam surfaces 49 and for all eight of the ramp cam surfaces 51, and therefore, description of the generation of one of the surfaces 49, and one of the surfaces 51 will be considered sufficient enablement of the invention.

Before describing the method of generation, in accordance with the present invention, it should be noted that on typical locking differentials produced and sold commercially by the assignee of the present invention, each of the cam surfaces is defined by a locus of lines perpendicular to the axis of the differential, as is generally well known in the art.

Figure 8A:
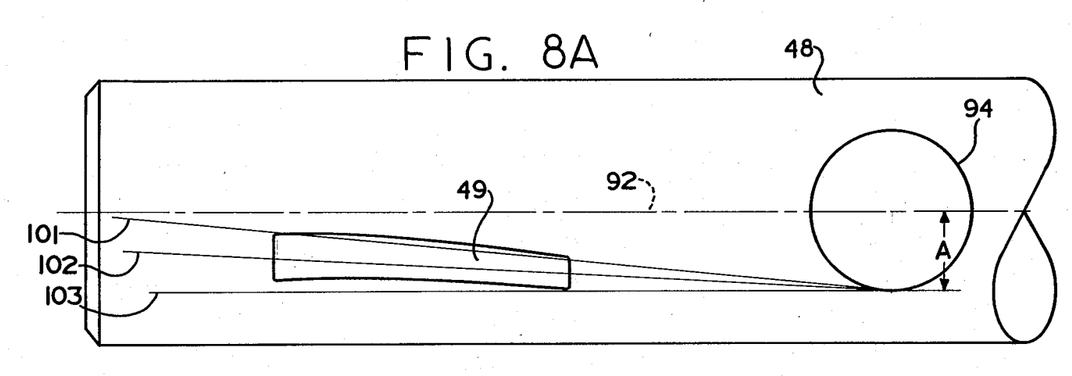
FIGS. 8A and 8B are somewhat schematic views, on the same scale as FIG. 7, illustrating the method of generating the shaft cam surface of the present invention.
Figure 8B:
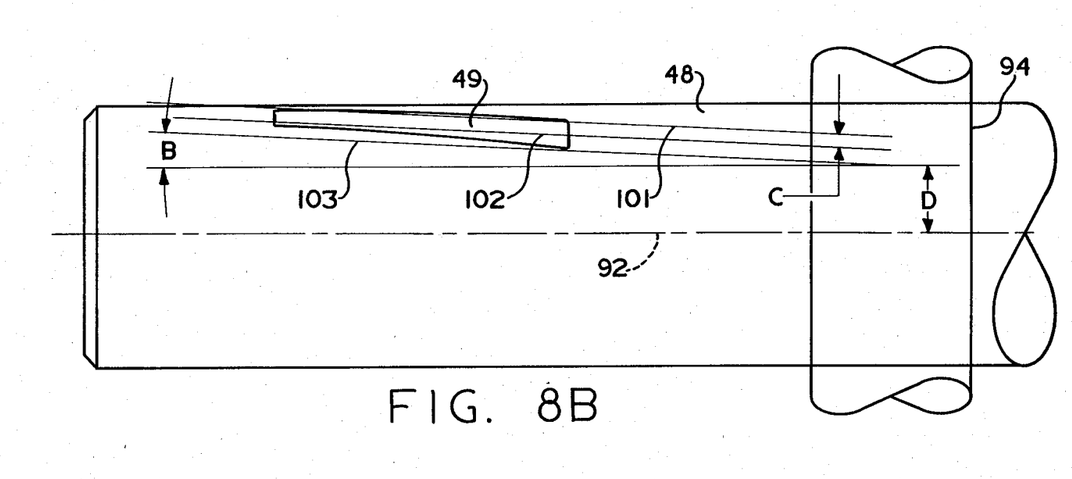

Referring now to FIGS. 8 and 8A, the generation of the shaft cam surface 49 will be illustrated and described. The generating method of the present invention utilizes an imaginary construction cylinder 94, the axis of which coincides with the axis of rotation of the positive drive, i.e., the axis of rotation of the axles 18 and 20. Although the specific use of a cylinder as the construction form is not an essential feature of the invention, it will be understood from the subsequent description of the method of generation that the cylinder 94 more or less inherently occurs. It should be noted that in both FIGS. 8A and 8B, the cam surface 49 appears somewhat narrower than in the normal view of FIG. 7, because in FIGS. 8A and 8B, the view of surface 49 is at an oblique angle. As is seen in FIG. 8A, the construction cylinder 94 has a radius A, and in the subject embodiment, the radius A is about 70 percent of the radius of the shaft 48, by of example only. It is believed that in most designs, the radius A will not exceed the radius of the shaft 48.

In accordance with one feature of the present invention, each of the surfaces 49 and 51 is defined by a common locus of generating lines. In FIGS. 8A and 8B, generating lines 101, 102, and 103 are illustrated, it being understood that only three generating lines are shown for simplicity, and that mathematically, the actual number of generating lines would approach infinity. Each of the generating lines is tangential to the construction cylinder 94, and each generating line is oriented at an oblique angle B relative to a construction plane containing the axis 92 of the shaft and being perpendicular to the axis of the drive (see FIG. 8B).

In order to understand the present invention, it is possible to view the generating lines as pivoting about a stationary cylinder 94, or alternatively, to view the cylinder 94 as being rotatable, with all of the generating lines being attached to (tangential to) the cylinder 94 at a single line, parallel to the axis of cylinder 94. In either case, it may be seen by comparing generating line 102 to 103, and 101 to 102 that, for any given amount of rotation of the construction cylinder 94 (or pivoting of the generating lines about the construction cylinder 94), as shown in FIG. 8A, the point of tangency of the generating line moves a fixed, predetermined distance C, as shown in FIG. 8B. The distance C is measured in a direction away from a construction plane which contains the axis 92 of the shaft 48, and is perpendicular to the axis of the drive. It should be understood that the distance C is preferably expressed as a distance per degree of rotation of the cylinder 94, and corresponds to the cam rise which is specified for the cam members of the prior art locking differentials. As is well known to those skilled in the art, the cam rise (i.e., axial movement of the cam per degree of relative rotation between the cam members), is determined by the configuration of the clutch. Therefore, once the clutch has been designed, the cam rise needed to engage the clutch can then be determined, after which the cam rise may be considered a fixed input factor when designing the cam mechanism.

Referring still to both FIGS. 8A and 8B, it may be seen that generating line 103 is parallel to the axis 92, as viewed in FIG. 8A. This parallel generating line 103 is tangent to the construction cylinder 94 at a point which is separated from the previously referenced construction plane (containing the axis 92) by a distance D. The distance D is important because it, in combination with the parallel orientation of the generating line 103 provides a convenient reference, as will be described in greater detail subsequently.

In accordance with the present invention, the shaft cam surface 49 and ramp cam surface 51 are both defined by the locus of all of the generating lines which satisfy the four previously mentioned dimensional factors A, B, C, and D.

With the factor C (cam rise) given for the reasons described previously, it is believed that there will be only one combination of the remaining factors A, B, and D which will result in an optimum design, for any particular design of positive drive. By "optimum" is meant a design which provides maximum surface contact between surfaces 49 and 51 throughout the operating range.

Figure 9A:
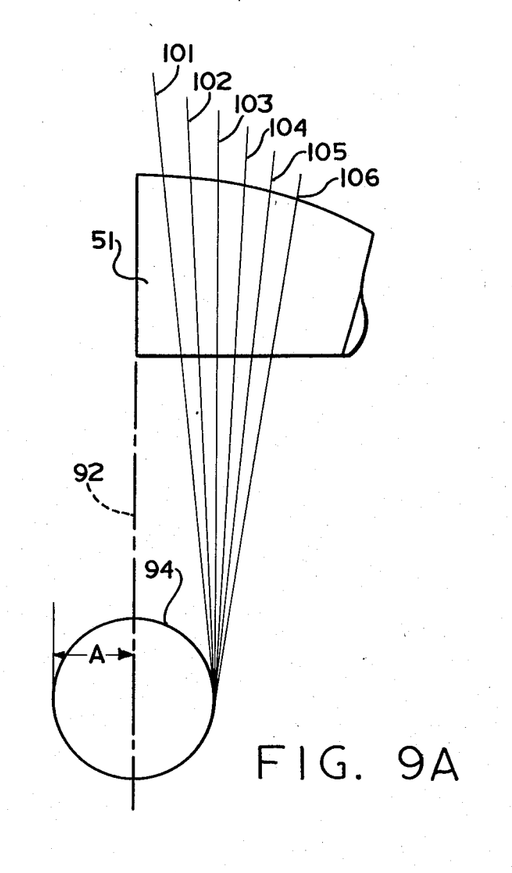
FIGS. 9A and 9B are somewhat schematic views, on the same scale as FIGS. 8A and 8B, and illustrating the generating method shown in FIGS. 8A and 8B, applied to the ramp cam surface of the present invention.
Figure 9B:
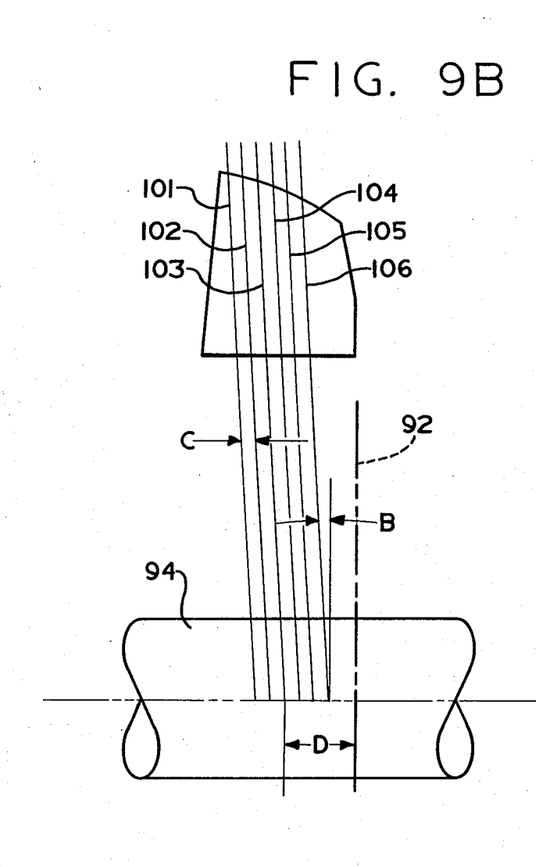

Referring now to FIGS. 9A and 9B, there is illustrated the generation of the ramp cam surface 51 in accordance with the present invention. The construction method illustrated in FIGS. 9A and 9B is identical to that illustrated in FIGS. 8A and 8B for generation of the shaft cam surface 49. Therefore, the description of the method illustrated in FIGS. 9A and 9B will not be repeated, but several comments will be offered.

It should first be noted in FIGS. 9A and 9B that, in addition to generating lines 101, 102, and 103, additional generating lines 104, 105, and 106 are illustrated, primarily because of the greater circumferential extent of the cam surface 51, compared to the cam surface 49. However, it should also be noted that the additional generating lines must still satisfy the requirements set forth previously, e.g., for a given amount of rotation of the construction cylinder 94, the point of tangency of the generating line moves the distance C.

It should also be noted that the distance D to the point of tangency of the generating line 103 (the "reference" generating line) is still measured from the axis 92 of the shaft 48, with only the axis 92 and not the shaft 48 being shown in FIG. 9B.

From a reading of the foregoing specification, it should be understood that each of the generating lines 101-106 (and the infinite number disposed therebetween), represents a machining line, i.e., a line along which machining occurs in order to generate the cam surfaces 49 and 51 having the desired configuration. It is believed to be within the knowledge of those skilled in the machining art to translate the generation method illustrated and described herein into any one of a number of well known machining techniques. However, the particular machining technique used forms no part of the present invention, and will not be described in greater detail herein.

The invention has been described in detail sufficient to enable one of ordinary skill in the art to make and use the same. Obviously, modifications and alterations of the preferred embodiment, and the environment in which it is used, will occur to others upon a reading and understanding of the specification, and it is intended to include all such alterations and modifications as part of the invention insofar as they come within the scope of the appended claims.

I claim:

1. In a positive drive of the type including an input member adapted to be rotated by input driving torque transmitted from a power source, first and second output members, defining an axis of rotation of the drive, first and second clutch means operably associated with said first and second output members, respectively, each of said clutch means having a disengaged mode which allows its respective output member to rotate relative to said input member when said respective output member is rotating at an angular velocity in the direction of torque transmittal that is greater than one predetermined angular velocity of the other output member, and an engaged mode which maintains a predetermined rotational relationship between said respective output member and said input member when said respective output member is rotating at an angular velocity in the direction of torque transmittal that is equal to or less than another predetermined angular velocity of the other output member, first and second cam means operably associated with said first and second clutch means, respectively, to move said clutch means from said disengaged mode to said engaged mode, and shaft means, defining an axis, disposed between said first and second clutch means and mounted for rotation with said input member, operative movement of one of said cam means, to move the respective clutch means, occurring in response to pivotal movement of said shaft means through a range relative to said one cam means, the improvement comprising:

(a) said first and second cam means each including a circumferentially-extending ramp cam surface;
(b) said shaft means defining at least a pair of shaft cam surfaces, each of said shaft cam surfaces being disposed to engage one of said ramp cam surfaces of said first and second cam means; and
(c) each engaging pair of said ramp cam and shaft cam surfaces being defined by a common locus of generating lines, a major portion of said generating lines being oriented nonparallel with respect to the axis of said shaft means, to maintain substantial surface-to-surface contact between said shaft means and said one cam means over the range of said pivotal movement of said shaft means.

2. The improvement as claimed in claim 1 wherein each of said generating lines is tangential to an imaginary construction cylinder having an axis which coincides with said axis of rotation of the drive.

3. The improvement as claimed in claim 2 wherein said imaginary construction cylinder has a radius A, said radius A being equal to or less than the radius of said shaft means.

4. The improvement as claimed in claim 2 wherein each of said generating lines is disposed at an oblique angle B relative to a first construction plane containing the axis of said shaft means and being perpendicular to said axis of the drive.

5. The improvement as claimed in claim 4 wherein said ramp cam surface and said shaft cam surface are defined by rotation of said imaginary construction cylinder to establish an orientation of said generating lines.

6. The improvement as claimed in claim 5 wherein, for each degree of rotation of said imaginary construction cylinder, the point of tangency of the respective generating line to said cylinder moves a distance C away from said first construction plane.

7. The improvement as claimed in claim 6 including a second construction plane containing both the axis of said shaft means and the axis of the drive, wherein a generating line parallel to said second construction plane is tangent to said construction cylinder at a predetermined distance D from said first construction plane.

8. In a device operable to permit differential action of first and second output members defining an axis of rotation of the device, the device being of the type including an input member adapted to be rotated by input driving torque transmitted from a power source, first and second clutch means operably associated with said first and second output members, respectively, each of said clutch means having a disengaged mode which allows its respective output member to rotate relative to said input member, and an engaged mode which maintains a predetermined rotational relationship between said respective output member and said input member, first and second cam means operably associated with said first and second clutch means, respectively, to move said clutch means from said disengaged mode to said engaged mode, and shaft means, defining an axis disposed between said first and second clutch means and mounted for rotation with said input member, operative movement of one of said cam means, to move the respective clutch means to its engaged mode, occurring in response to pivotal movement of said shaft means through a range, about said axis of rotation of the device, relative to said one cam means, said first and second cam means each including a circumferentially-extending ramp cam surface; the improvement comprising:

(a) said first and second cam means each including a circumferentially-extending ramp cam surface;

(b) said shaft means defining at least a pair of shaft cam surfaces, each of said shaft cam surfaces being disposed to engage one of said ramp cam surfaces of said first and second means; and (c) each engaging pair of said ramp cam and shaft cam surfaces being defined by a common locus of generating lines, a major portion of said generating lines being oriented nonparallel with respect to the axis of said shaft means, to maintain substantial surface-to-surface contact between said shaft means and said one cam means over the range of said pivotal movement of said shaft means.

9. The improvement as claimed in claim 8 wherein each of said generating lines is tangential to an imaginary construction cylinder having an axis which coincides with said axis of rotation of the device.

10. The improvement as claimed in claim 9 wherein said imaginary construction cylinder has a radius A, said shaft means having a radius said radius A being equal to or less than the radius of said shaft means.

11. The improvement as claimed in claim 9 wherein each of said generating lines is disposed at an oblique angle B relative to a first construction plane containing the axis of said shaft means and being perpendicular to said axis of the device.

12. The improvement as claimed in claim 11 wherein said first ramp cam and shaft cam surfaces are defined by rotation of said imaginary construction cylinder in a direction to establish an orientation of said locus of generating lines.

13. The improvement as claimed in claim 12 wherein, for each degree of rotation of said imaginary construction cylinder, the point of tangency of the respective generating line to said cylinder moves a distance C away from said first construction plane.

14. In a clutch actuating mechanism of the type including an input member adapted to be rotated by input driving torque, an output member defining an axis of rotation of the mechanism, clutch means operably associated with said output member, said clutch means having a disengaged mode which allows said output member to rotate relative to said input member, and an engaged mode which maintains a predetermined rotational relationship between said output member and said input member, cam means operably associated with said clutch means to move said clutch means from said disengaged mode to said engaged mode, and shaft means, defining an axis, disposed adjacent said cam means and mounted for rotation with said input means, operative movement of said cam means, to move said clutch means, occurring in response to pivotal movement of said shaft means, about the axis of the mechanism, relative to said cam means, said cam means including a circumferentially-extending ramp cam surface, and said shaft means including a shaft cam surface disposed to engage said ramp cam surface during said pivotal movement of said shaft means, through a full range the improvement comprising:

(a) said ramp cam surface and said shaft cam surface both being defined by a common locus of generating lines, a major portion of said generating lines being oriented nonparallel with respect to the axis of said shaft means, whereby said cam surfaces maintain substantially surface-to-surface contact over the full range of said pivotal movement of said shaft means.

15. The improvement as claimed in claim 14 wherein each of said generating lines is tangential to an imaginary construction cylinder which coincides with said axis of rotation of the mechanism.

16. The improvement as claimed in claim 15 wherein each of said generating lines is disposed at an oblique angle B relative to a first construction plane containing the axis of said shaft means and being perpendicular to said axis of the mechanism.

17. The improvement as claimed in claim 15 wherein said imaginary construction cylinder has a radius A, said shaft mean has a radius said radius A being equal to or less than the radius of said shaft means.

18. The improvement as claimed in claim 16 wherein said ramp cam surface and said shaft cam surface are defined by rotation of said imaginary construction cylinder to establish an orientation of said generating lines.

19. The improvement as claimed in claim 18 wherein, for each degree of rotation of said imaginary construction cylinder, the point of tangency of the respective gener-ating line to said cylinder moves a distance C away from said first construction plane.

20. The improvement as claimed in claim 19 including a second construction plane containing both the axis of said shaft means and the axis of the mechanism, wherein a generating line parallel to said second construction plane is tangent to said construction cylinder at a distance D from said first construction plane.

21. The improvement as claimed in claim 14 wherein said cam means is movable axially along the axis of said mechanism in response to said pivotal movement of said shaft means relative to said cam means.

* * * * *